United States Patent [19]

Horna et al.

[11] Patent Number: 4,645,883
[45] Date of Patent: Feb. 24, 1987

[54] DOUBLE TALK AND LINE NOISE DETECTOR FOR A ECHO CANCELLER

[75] Inventors: Otakar A. Horna, Bethesda; Edwin A. Stennett, Gaithersburg, both of Md.; Ferial T. El-Mokadem, Great Falls, Va.

[73] Assignee: Communications Satellite Corporation, Washington, D.C.

[21] Appl. No.: 608,628

[22] Filed: May 9, 1984

[51] Int. Cl.⁴ .............................................. H04B 3/20
[52] U.S. Cl. .................................................... 379/406
[58] Field of Search ............ 381/46; 179/170.2, 170.6, 179/170.8

[56] References Cited

U.S. PATENT DOCUMENTS

| | | | |
|---|---|---|---|
| 3,161,838 | 12/1964 | Flanagan et al. | 179/170.6 X |
| 3,427,478 | 2/1969 | Etter | 331/78 |
| 4,000,369 | 12/1976 | Paul, Jr. et al. | 381/46 |
| 4,282,411 | 8/1981 | Stewart | 179/170.2 |
| 4,351,983 | 9/1982 | Crouse et al. | 381/46 |
| 4,360,712 | 11/1982 | Horna | 179/170.2 |

*Primary Examiner*—Gene Z. Rubinson
*Assistant Examiner*—R. Vaas
*Attorney, Agent, or Firm*—Sughrue, Mion, Zinn, Macpeak & Seas

[57] ABSTRACT

An echo canceller comprising an adaptive finite impulse response filter receiving a receive signal and having its output subtracted from a send signal, a non-linear device for attenuating low level signals of the send signal and a noise injector for injecting noise into the send signal proportional to a dynamically measured background noise in the subtracted output. The non-linear device and the noise injector are disabled when the receive signal is below expected noise level or the send signal is at a high level relative to the receive signal.

11 Claims, 2 Drawing Figures

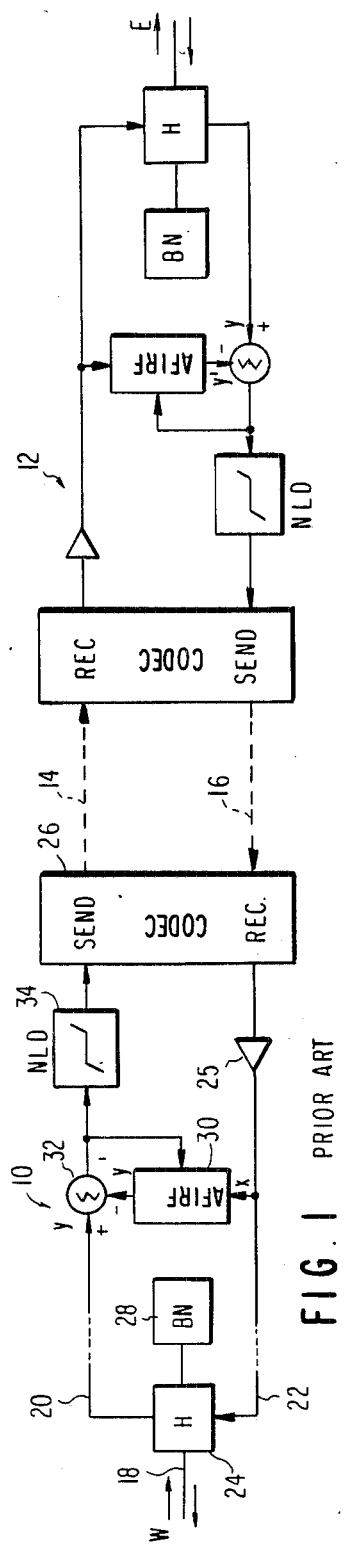
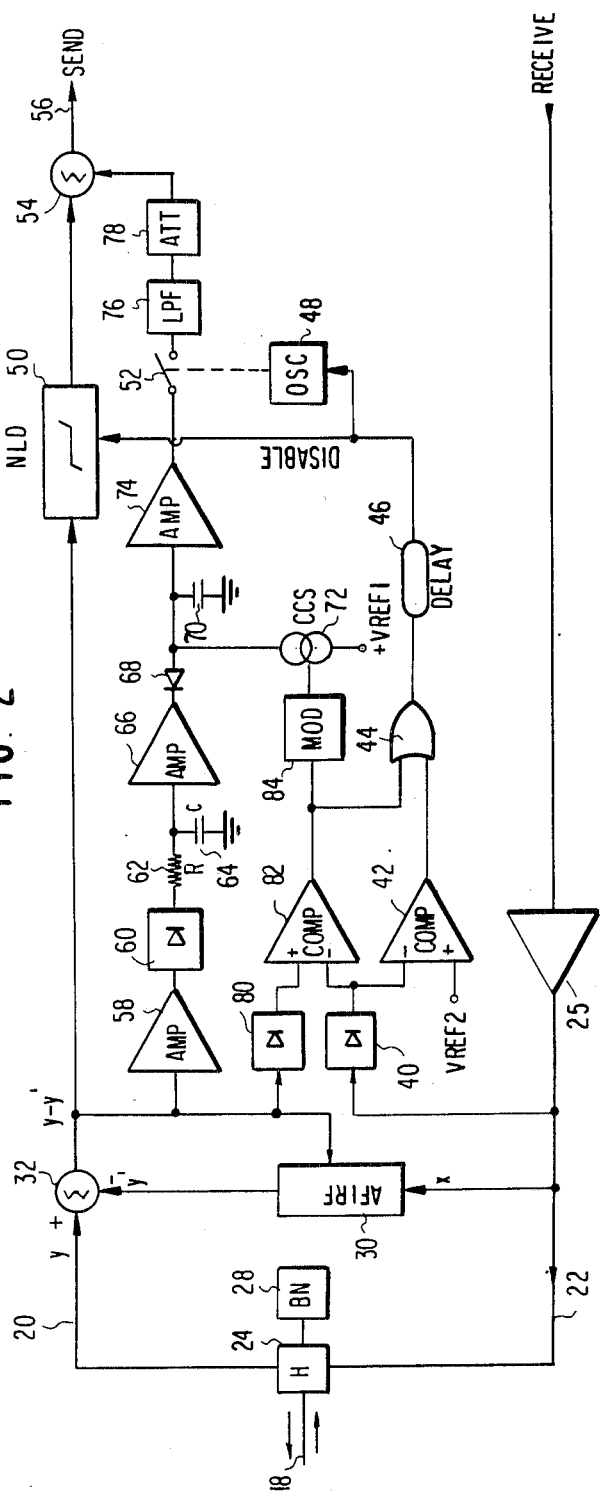

DOUBLE TALK AND LINE NOISE DETECTOR FOR A ECHO CANCELLER

BACKGROUND OF THE INVENTION

The invention relates generally to echo cancellers, and it relates, in particular to a double talk detector and a line noise detector for improved echo cancellation.

Echoes present a problem for long distance, two-way communication systems. In such a system, a station both receives a signal for its own use and transmits another signal containing different information. However, the received and transmitted signals, although they are supposed to be independent, are often not completely isolated. The result is that the received signal is re-transmitted at a lower level along with the intended transmitted signal. Because of the long transmission path between two stations, one station hears a delayed echo of its own transmission in its received signal. This echo has passed through the station with which it is in communication or an intermediate station.

Echoes are particularly noticeable when only one station is talking because the attenuated echo is not masked by a larger transmitted signal. A conventional method of eliminating echoes is an echo suppressor which disconnects the transmitting side of a station when no high level signal is present on the transmit side. One such echo suppressor system is described by Skrovanek et al in U.S. Pat. No. 4,115,668. Echo suppressors have found wide use in the telephone industry but suffer from several drawbacks. It is not uncommon for both talkers in a telephone conversation to be simultaneously talking. Accordingly, a double talk detector is often used to detect high level signals on both the transmit and receive lines. When the double talk condition is detected, echo suppression is removed by opening up the transmit line. However, the echo path is then re-enabled and an echo can often be heard within the transmitted signal.

In order to avoid the problems with echo suppressors, echo cancellers have been developed in recent years which, instead of breaking the transmit line, subtract the echo from the transmitted signal. An example of a telephone system using echo cancellers is shown in block diagram form in FIG. 1, in which their are two nearly identical stations, a west station 10 and an east station 12. Long distance communication between the two stations 10 and 12 is performed on unidirectional transmission paths 14 and 16. These channels 14 and 16 may be terrestrial wires or microwave channels or may involve communication satellites. A telephone at the west station 10 is connected into the system by a two-wire circuit 18 which is connected into four-wire circuit lines 20 and 22 through a hybrid 24. The four-wire lines are interfaced to the transmission channels 14 and 16 through a codec which performs a number of functions in the telephone industry, such as channel selection and momentary disconnection of four-circuit lines which are momentarily silent in order to increase the capacity of the transmission channels. Also connected to the hybrid 24 is a balancing network 28 which is intended to balance the impedance of the two-wire circuit 18. If the hybrid 24 is working perfectly, the received signal on the line 22 is completely diverted to the two-wire circuit 18 and is thus completely isolated from the outgoing line 20 for the transmitted signal. In this optimum case, there is no echo arising through the hybrid 24. However, because the impedance on the two-wire circuit 18 tends to vary and for other reasons, the hybrid 24 does not completely isolate the receive line 22 and the transmit line 20. As a result, an attenuated echo passes through the hybrid 24.

In order to prevent the re-transmission of such an echo, an echo canceller is inserted on the fourwire circuit. The signal x on the receive line 22 is connected to the input of an adaptive finite impulse response filter (AFIRF) 30. The AFIRF is well known and is described in an article by the inventor entitled "Echo Canceller With Adaptive Transversal Filter Utilizing Pseudo-Logarithmic Coding" appearing in *Comsat Technical Review*, Vol. 7, No. 2, Fall 1977 at pages 393–428. The AFIRF 30 adaptively models the response of the hybrid 24 and its associated connections to create an echo of the received signal so that when the received signal x is fed to its input, the filter produces a signal y' on its output which is a prediction of the echo. The predicted echo y' is connected to an inverting input of a summer 32. A noninverting input of the summer 32 is connected to the transmit line 20 which carries a signal y which is the sum of the echo and the intended transmit signal. The output of the summer 32, the difference $y-y'$ of the transmit signal and the predicted echo, is fed back to the AFIRF 30 for adapting its filtering response. The difference $y-y'$ is also put through a non-linear device 34 which has zero output for low level input signals. The non-linear device 34 is intended to remove residual errors between a true echo and its predicted value y'. If the signal y additionally contains a high level transmit signal, the high level signal passes through the non-linear device 34.

The echo canceller of FIG. 1, though superior to an echo suppressor, still suffers several drawbacks. The non-linear device 34 suppresses not only the residual echo but also the telephone line background noise when a high level signal is not present on the transmit line 20. It does however pass the noise in the presence of a high level signal. This effect can produce the impression that the telephone connection has been broken because of the sudden disappearance of all noise.

The echo canceller may be equipped with a double talk detector which disables the non-linear device 34, that is, removes the non-linearity, when the signal level on the receive side drops below a predetermined level. For instance, the bias point on a diode determines its non-linearity. Double-talk detectors are discussed by Horna in U.S. Pat. No. 4,360,712. If, however, the line is noisy, every pause in speech from the other station causes an increase of noise at the output of the disabled or linearized non-linear device 34. If the codec 26 is equipped with an adaptive quantization circuit for a constant ratio of signal to quantization noise or a voice recognition circuit for disconnecting unused transmit lines, the sudden increase in background noise can be detected as a speech signal and transmitted as speech despite its only being a noise burst.

Both of these problems have been known since echo suppressors have been used to control echoes. As a result, several devices were developed to measure the background noise and to then inject noncorrelated noise of the same RMS value at the output of the echo suppressor when the switch in the suppressor has broken the transmit line. The injection of noise prevents a change in the minimum signal level when operating the suppressor switch. An analog circuit of this type is described by Flanagan et al in U.S. Pat. No. 3,161,838.

Crouse et al describe a more sophisticated circuit in U.S. Pat. No. 4,351,983. This circuit measures the background noise with digital processing. However, neither of these devices is directly applicable to circuits with echo cancellers. Both are relatively complex and have several limitations. They do not properly discriminate between background noise and echo signal and their turn-on time and operation speed are too slow.

SUMMARY OF THE INVENTION

Accordingly, it is an object of this invention to provide an echo canceller that does not have discontinuous changes in output noise levels.

It is a further object of this invention to provide noise injection in an echo canceller with simple inexpensive circuitry.

The invention can be summarized as a double talk and line noise detector and echo canceller that emulates the echo response of a circuit and subtracts the emulated echo from the transmitted signal. According to the invention, a noise level is measured in the transmitted signal during periods of voice silence. When the signal on the receive line exceeds a predetermined level, a non-linear device is inserted into the transmit line and a noise equal to the measured value is added to the transmitted signal. However, when the echo-cancelled transmit signal exceeds the receive signal, indicating that a voice signal is intended to be transmitted, or when the receive signal is below the predetermined level, indicating that there is no non-noise echo to be cancelled, the non-linear device is disabled or linearized and the noise signal is not injected.

BRIEF DESCRIPTION OF THE DRAWINGS

FIG. 1 is a block diagram of a prior art echo canceller; and

FIG. 2 is a block diagram of the echo canceller of the present invention.

DETAILED DESCRIPTION OF THE PREFERRED EMBODIMENT

The invention is intended to provide a more natural background noise on the output of an echo canceller while still cancelling any residual echo with a non-linear device. In normal operation when a high level receive signal is present but no voice signal is being transitted, a non-linear device attenuates the low level residual non-cancelled echo and noise is injected equal to normal background noise. However, if no large signal is being received or if a large signal is being transmitted, the non-linear device is linearized and no additional noise is injected.

An embodiment of the echo canceller of the present invention is schematically represented by the block diagram in FIG. 2. This echo canceller uses many of the same elements as the prior art echo canceller illustrated in FIG. 1. The receive amplifier 25, the four-wire receive line 22 and transmit line 20, the two-wire circuit 18, the hybrid 24 and the balancing network 28 are standard components in telephone systems. The adaptive finite impulse response filter (AFIRF) 30 and the summer 32 form a conventional echo canceller and their operation has previously been described. It will be assumed that the echo canceller has been operating for a sufficiently long period that the AFIRF 30 has already adapted to its optimum value so that it is emulating the echo path of the hybrid 24, the two-wire circuit 18 and the balancing network 28. A detector 40 is connected to the receive line 22 and has its output connected to the inverting (−) input of a comparator 42. The non-inverting (+) input of the comparator 42 is connected to a reference voltage, $V_{REF2}$. This reference voltage is set to a value larger than the voltage produced by the detector 40 when only typical noise is present on the receive line 22. The typical noise level can be selected as the power level of 20 dBrnC. The dBrnC power is a logarithmic or dB power measured relative to 0 dBrnC, which is the minimum level for auditory sensation, exactly 90 dB below a 1 mW signal at 600Ω impedance. However, $V_{REF}$ is set to 45 dBrnC because below this level no echo suppression is needed and it is better not to correct the transmitted signal with a non-linear device. Thus when no voice signal but only noise is being received, the output of the comparator 42 is a logical one. This output is connected through an OR-gate 44 and a delay 46 to the disable inputs of an oscillator 48 and a non-linear device 50 connected to the output of the echo summer 32. When the oscillator 48 is oscillating, it serves to intermittently close a switch 52, to be described later. However, in the presence of a logical one at their disable inputs, the non-linear device 50 presents a nearly linear impedance and the oscillator 48 keeps its switch 52 in the open position. A noise summer 54 is connected to the output of the non-linear device 50 but in the situation where the switch 52 is open, the summer 54 simply passes the output of the non-linear device 50 to the send line 56. In the situation as described, when only noise is present on the receive line 22, the echo canceller is working but the non-linear device 50 is disabled and no noise is being injected into the send line 56.

Assume for the moment that not only is no voice signal being received on the receive line 22 but also that the near speaker attached to the two-wire circuit 18 is silent. Under these circumstances, the output y—y′ of the adder 32 is only uncorrelated noise, that is, the noise of the two-wire circuit 18 and of the echo loop. The noise that is present on the receive line 22 has been mostly cancelled by the AFIRF 30 and the summer 32, i.e. the echo canceller. This background noise signal is amplified by an amplifier 58 and is then rectified by a rectifier 60. The output of the rectifier is averaged by an integrating RC circuit comprising a resistor 62 and a capacitor 64. The time constant of the integrator circuit is chosen to be in the range from 50 to 500 ms. The average rectified background noise level is amplified by a voltage amplifier 66 and its output is led in the reverse direction through a diode 68 to a memory capacitor 70 connected to ground. The memory capacitor 70 is also charged by a constant current source 72 that has its other terminal connected to a positive reference voltage, $V_{REF1}$. The capacitance of the memory capacitor 70 and the current output of the constant current source 72 are chosen so that the resultant time constant $T_M$ is many times longer than the averaging time constant of the integrating circuit 62 and 64, for instance several seconds to 30 seconds. The voltage on the memory capacitor 70 is limited to being no higher than the output voltage of the amplifier 66. Once this condition is exceeded, the diode 68 becomes forward biased and the current is easily sunk in the low impedance output of the amplifier 66.

Thus when the voltage on the output of the amplifier 66, i.e. average noise level, drops, the memory capacitor 70 very quickly discharges through the diode 70 to the new voltage value. Therefore, after several seconds the voltage on the memory capacitor 70 stabilizes at a value which is proportional to the line noise and does not substantially increase even when the signal y—y' significantly rises, as long as the period of this higher level of y—y' is substantially shorter than the time constant $T_M$. The signal y—y' rises when a voice signal is being transmitted. However, it is a characteristic of human conversation that there are many silent pauses of the order of 50 to 500 ms (the integration time of the integrating circuit 62 and 64). Therefore as long as these pauses are recurring within the time period $T_M$ (several seconds), then the voltage on the memory capacitor represents the noise level despite the fact that this noise is being measured on a line carrying a significantly higher voice signal.

If a voice signal of sufficient amplitude appears at the output of the receive amplifier 25, the output of the comparator 42 goes to a logical zero which passes through the OR-gate 44 to the delay 46. The delay 46 is chosen to be between 20 and 100 ms and is necessary to account for the delay in the echo and to prevent a random noise pulse of high amplitude from being interpreted as a voice signal. The delay 46 may be implemented with an RC circuit and it then has an averaging time directly related to the delay time. The logical zero then enables the oscillator 48 and the non-linear device 50.

The non-linear device 50 acts as a center clipper for the output of the summer 32. The non-linear characteristics can be introduced by anti-parallel diodes. In some applications it is desirable to make the non-linear device 50 adaptive so that the flat portion of its characteristic becomes wider in the presence of a high noise level. The oscillator 48, in its enabled condition, opens and closes the switch 52 which is connected to the output of the amplifier 58 connected to the memory capacitor 70. In one embodiment of the invention, the oscillator 48 produces randomly spaced pulses of equal amplitude. The power spectrum of its output should be substantially flat to well above audio frequencies, such as is provided by pulses of random period. The output of the switch 52 is passed through a low-pass filter 76 which should cut-off above audio frequencies. For instance, for a 3.3 kHz transmission line, the low-pass filter 76 can have a 5 kHz cut-off. The output of the low-pass filter 76 is led through an attenuator 78 to the other input of the adder 54. The effect of the described circuit is to produce random noise of an amplitude determined from the measured line noise. The attenuator 78 needs to be calibrated with the rest of the circuit to produce the desired equivalence between measured noise values and injected noise level. The noise adder 54 injects generated noise into the send line 56 whenever the non-linear device 50 is enabled and removes the low level noise from the output of summer 32, i.e., noise similar to that removed by the non-linear device 50 is inserted into the send line at summer 54. The result is that the same noise level remains on the send line 56 during periods of voice silence on the transmit side regardless of whether the non-linear device has been disabled or not.

Because an echo is very effectively cancelled by the predicted echo y' from the AFIRF 30 (usually greater than 20 dB cancellation), variations in the receive signal do not greatly affect the measured noise level appearing on the memory capacitor 70. Furthermore, because a typical speech pattern is composed of a short burst followed by a silent pause, the voltage on the memory capacitor 70 does not change more than a few percent during a typical high level signal on the send line 56. Thus the injected noise which is proportional to the voltage on the memory capacitor 70 is sufficiently constant during the periods in which noise is being injected by the noise summer 54.

If the speaker attached to the two-wire circuit 18 is talking, a signal uncorrelated with the receive signal on the receive line 22 appears on the hybrid output line 20. This voice signal is not cancelled by the AFIRF 30 and the adder 32 so that a high level signal y—y' appears on the output of the adder 32. A detector 80 is connected to receive the signal y—y', and the detector output is connected to the noninverting input of a double talk comparator 82. The rectifiers 80 and 40 are separately biased so that their outputs switches the double talk comparator 82 when the send signal outputted by the adder 32 equals a level predetermined amount below the level of the receive signal itself. This reduced level is a worst case estimate of the level of the echo of the receive signal. The inverting input of the double talk comparator 82 is connected to the output of the detector 40 on the receive line 22. Thus, when the send voice signal is greater than the worse case estimated echo of the receive voice signal, the double talk comparator 82 outputs a logical one. This output is connected through the OR-gate 44 to the disable inputs of the non-linear device 50 and the oscillator 48. These devices are disabled because any residual echo is masked by the near talker's speech signal and does not need to be removed. The output of the double talk comparator 82 is also connected to a modulator 84 which controls the current output of the constant current source 72. In the presence of a logical one on the input to the modulator 84, the current output of the constant current source 72 is reduced by a factor of 5 to 15 from the value in the presence of a logical zero. This produces a correspondingly increased time constant $T_M$ on the memory capacitor 70. During periods of speech from the near talker, the signal level of which has to be substantially higher than the line noise, the output of the amplifier 66 is also higher than the voltage on the memory capacitor 70, measuring the background noise, so that the diode 68 is backward biased. However, with the reduced current output of the constant current source 72, which is designed to only compensate for the leakage current of the memory capacitor 70, the voltage on the memory capacitor 70 does not have the opportunity to substantially rise during the speech bursts which are usually no longer than 1.5 to 2.5 seconds.

During the short speech breaks, the output of the voltage amplifier 66 is returned to the level determined by the line noise and the memory capacitor 70 is swiftly discharged to the same level. Therefore at the end of a speech burst, when the oscillator 48 and the non-linear device 50 are again enabled, the noise level on the send line 56 is at the level of the uncorrelated noise appearing at the output of the echo summary 32 before the occurrence of the speech burst. During the period of transmitted speech, the presence or absence of a signal on the receive side does not affect the operation of the double talk detector as long as the transmitted signal is larger than the echo of the received signal. This lack of influence is caused by the fact that the echo of the receive signal is attenuated or cancelled at the output of the echo summer by at least 20 dB and the non-linear device 50 and the oscillator 48 are disabled regardless of the level of the signal on the receive line and the corresponding output of the comparator 42.

A slightly different embodiment of the invention should be used when the echo canceller is used in conjunction with a codec which assigns the communication channel only on demand. A demand assignment codec relies on the fact that a particular transmission channel is only in use about .25 percent of the time because of pauses in normal speech and the low probability of simultaneous speaking. These codecs must have a very sensitive voice recognition detector which disconnects the channel during speech pauses and uses the channel to transmit a signal from another source. These codecs typically generate at the receive side their own masking noise of 32 dBrnCO during the disconnect period in order to simulate a continuous circuit. For these codecs, it is often preferable to use, instead of random noise, a sine wave of the RMS value proportional to the line noise at the output of the echo summer 32. The codec requires some kind of noise on the line because it uses adaptive quantizers and measures noise levels. The advantage of sine wave noise is that its RMS-to-peak ratio is constant and approximately 8 dB lower than for white noise with a probability of 0.1%. This characteristic facilitates the design and operation of the speech detector in the codec which is usually based on measuring the RMS-to-peak ratio of the signal because the codec does not transmit a noise-only signal on the send side but instead injects white noise on the receive side for the interrupted channel. Therefore, the unnatural sine wave noise does not propagate to the listener. However, the frequency of the sine wave noise can be chosen sufficiently low, e.g. below 300 Hz where the sensitivity of hearing is very low for low-level signals. Therefore, even when this signal is accidentally transmitted, it is barely perceived by the listener.

For this embodiment, only minor variations to the circuit diagram of FIG. 2 are required. The oscillator 48, instead of being a random pulse generator, is a constant frequency pulse generator of the same frequency as the desired sine wave noise. The lowpass filter 76 is replaced by a band-pass filter centered at the desired frequency of the sine wave noise. The band-pass filter eliminates from the square wave at the output of the switch 52 the higher harmonics which are in the most sensitive frequency range of the human ear, i.e., between 600 Hz and 2 kHz.

We claim:

1. An echo canceller for removing echoes propagating from a receive line to a send line through a transmit/receive station, comprising:
    means for emulating an echo resulting from a signal on a receive line within a station;
    subtracting means for subtracting said emulated echo from a signal on said send line;
    means for measuring an average background noise on an output of said subtracting means;
    a non-linear device connected to said output of said subtracting means for selectively, when enabled, attenuating low level signals on an input of said non-linear device;
    means for selectively injecting onto an output of said non-linear device, when enabled, a noise signal proportional to said measured background noise; and
    means for detecting a signal above a predetermined limit on said receive line and, in response to said detection, for enabling said non-linear device and said injecting means.

2. An echo canceller as recited in claim 1, further comprising means for deriving a level signal representative of a level of the signal on said receive line and means for detecting when a signal on said output of said subtracting means is greater than said level signal and in response to said detection for enabling said non-linear device and said injecting means.

3. An echo canceller as recited in claim 2, wherein said emulating means is an adaptive finite impulse response filter.

4. An echo canceller as recited in claim 1, wherein said background noise measuring means comprises:
    detecting and averaging means connected to said output of said subtracting means for measuring the amplitude of a signal on said output of said subtracting means, said measured amplitude being continuously averaged over an averaging period between 50 and 500 milliseconds; and
    minimum signal measuring means connected to an output of said detecting and averaging means for continuously measuring the minimum value of a signal on said output of said detecting and averaging means over a period substantially longer than said averaging period, an output of said measuring means being the average background noise.

5. An echo canceller as recited in claim 4, wherein said injecting means comprises:
    oscillating means coupled to said minimum signal measuring means for producing an oscillatory signal having a constant frequency of no more than 300 Hz with an amplitude related to said measured background noise when said oscillating means is enabled; and
    an adder coupled to outputs of said non-linear device and said oscillating means.

6. An echo canceller as recited in claim 4, further comprising time constant changing means responsive to an output signal of said detecting means for increasing said period of said minimum signal measuring means in response to said detection by said detecting means.

7. An echo canceller for removing echoes from a receive line to a send line through a transmit/receive station, comprising:
    an adaptive finite impulse response filter receiving a signal on said receive line for emulating an echo produced by said signal;
    subtracting means for subtracting a signal on an output of said filter from a signal on said send line;
    a non-linear device connected to an output of said subtracting means for more greatly attenuating low level signals than high level signals on said output of said subtracting means when said device is not disabled;
    summing means connected to an output of said non-linear device and receiving a signal therefrom and also receiving an injected noise signal, and output signal of said summing means being an output signal of said station and said echo canceller;
    two detectors being a first send detector and a second send detector connected to said output of said subtracting means;
    an averaging circuit receiving an output of said send detector, said circuit having an averaging period between 50 and 500 milliseconds;
    a signal generating circuit for producing a signal increasing in amplitude with a characteristic time of increase substantially larger than said averaging period;

means for limiting an output signal of said signal generating circuit to signals comparable in amplitude to signals on an output of said averaging circuit, said limited output signal being an average background noise;

oscillating means for producing an oscillatory signal having an amplitude related to said average background noise when said oscillatory means is not disabled, an output signal of said oscillating means being said injected noise signal;

a detector being a receive detector connected to said receive line; and disabling means for disabling said non-linear device and said oscillating means when an output signal of said receive detector is less than a predetermined limit, or for disabling said non-linear device and said oscillating means when a signal on said output of said second send detector exceeds said output signal of said receive detector.

8. An echo canceller as recited in claim 7, wherein said oscillating means produces an oscillatory signal of random period.

9. An echo canceller as recited in claim 7, wherein said oscillating means produces a sinusoidal signal of frequency no greater than 300 hertz.

10. An echo canceller as recited in claim 7, further comprising delaying means for delaying the disabling means by 20 to 100 milliseconds.

11. An echo canceller as recited in claim 7, further comprising means for increasing the characteristic time of said signal generating circuit when a signal on said output of said second send detector exceeds said output signal of said receive detector.

* * * * *